(12) United States Patent
Ozawa

(10) Patent No.: US 8,992,027 B2
(45) Date of Patent: Mar. 31, 2015

(54) PROJECTOR AND CONTROL METHOD FOR PROJECTOR

(75) Inventor: Takashi Ozawa, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 186 days.

(21) Appl. No.: 13/534,858

(22) Filed: Jun. 27, 2012

(65) Prior Publication Data

US 2013/0010269 A1  Jan. 10, 2013

(30) Foreign Application Priority Data

Jul. 5, 2011  (JP) ................................. 2011-148903

(51) Int. Cl.
*G03B 21/26* (2006.01)
*G03B 21/00* (2006.01)
*G09G 5/00* (2006.01)
*H04N 9/31* (2006.01)
*G03B 21/14* (2006.01)

(52) U.S. Cl.
CPC .............. *H04N 9/3179* (2013.01); *G03B 21/14* (2013.01); *G03B 2206/00* (2013.01)
USPC ................. 353/94; 353/121; 345/1.3

(58) Field of Classification Search
CPC ... H04N 9/3147; H04N 9/3197; G03B 21/14; G09G 2300/026; G06F 3/1446; H04L 29/06
USPC ............ 353/121, 30, 31, 94; 345/1.3, 30, 33; 348/564; 709/209, 208, 210, 211
See application file for complete search history.

(56) References Cited

U.S. PATENT DOCUMENTS

| | | | |
|---|---|---|---|
| 2002/0108108 | A1 | 8/2002 | Akaiwa et al. |
| 2002/0159035 | A1* | 10/2002 | Koyama et al. ................. 353/31 |
| 2005/0012911 | A1* | 1/2005 | Cambron ...................... 353/122 |
| 2005/0264772 | A1 | 12/2005 | Masukawa |
| 2008/0234843 | A1 | 9/2008 | Akaiwa et al. |

FOREIGN PATENT DOCUMENTS

| | | |
|---|---|---|
| CN | 1386213 A | 12/2002 |
| JP | 2005-338604 A | 12/2005 |
| JP | 2005-351996 A | 12/2005 |
| JP | 2011-34028 A | 2/2011 |

* cited by examiner

*Primary Examiner* — William C Dowling
*Assistant Examiner* — Ryan Howard
(74) *Attorney, Agent, or Firm* — ALG Intellectual Property, LLC

(57) ABSTRACT

A projector can be connected in cascade to another projector. Either a first mode for the projector to operate as a leading projector in the cascade connection or a second mode for the projector to operate as a second or subsequent projector in the cascade connection is set. The projector is made available for use on authentication by an authentication unit or on reception of use permission information of the projector by a receiving unit.

8 Claims, 4 Drawing Sheets

PROJECTOR AND CONTROL METHOD FOR PROJECTOR

The entire disclosure of Japanese Patent Application No. 2011-148903 filed Jul. 5, 2011 is expressly incorporated by reference herein.

BACKGROUND

1. Technical Field

The present invention relates to a projector and a control method for a projector.

2. Related Art

According to a related art, as a method for preventing unauthorized use of a projector, inputting a personal identification number via a remote controller (remote) is known. However, in an installation environment where plural projectors are used in the same place, it is troublesome to input a personal identification number to all the projectors every time the projectors are started up.

JP-A-2005-351996 discloses a projector which authenticates when a USB key is inserted into or removed from the projector or when an RF tag is held over the projector.

Such a projector can prevent unauthorized use of the projector without requiring input of a personal identification number.

However, with the projector of JP-A-2005-351996, though input of a personal identification number is not required, the user needs to carry out an operation for authentication near all the projectors and the time and effort required before the use is not reduced. Moreover, when the projector is hung from the ceiling, there is a problem that the user cannot carry out an operation of inserting or removing a USB key or holding an RF tag over the projector.

SUMMARY

An advantage of some aspects of the invention is to solve at least a part of the problems described above, and the invention can be implemented as the following forms or application examples.

APPLICATION EXAMPLE

This application example of the invention is directed to a projector which modulates and projects light emitted from a light source according to image information, including: a transmitting unit and a receiving unit which enable connection in cascade to at least one other projector and are adapted for communicating with the other projector which is connected in cascade; a mode setting unit which sets either a first mode for the projector to operate as a leading projector in the cascade connection or a second mode for the projector to operate as a second or subsequent projector in the cascade connection; an input operation unit which accepts an input operation; an authentication unit which authenticates to make the projector available for use; and a control unit which controls an operation of the projector. The control unit makes the projector available for use on success of authentication by the authentication unit or on reception of use permission information of the projector by the receiving unit.

According to this application example, the projector is made available for use on success of authentication by the authentication unit or on reception of use permission information. Thus, the time and effort to perform an authentication operation for all the plural projectors that are connected in cascade can be eliminated.

Also, when the leading projector in the cascade connection is authenticated, use permission information can be sequentially sent to the second and subsequent projectors and these projectors become available for use. Thus, by authenticating only the leading one projector in the cascade connection, all the projectors can be made available for use.

Also, first identification information which identifies the projector itself and second identification information which identifies a next projector in the cascade connection may be provided. The second identification information together with the use permission information may be transmitted to the next projector. The next projector may become available for use when the second identification information received together with the use permission information coincides with the first identification information which identifies this next projector. Thus, when there is a projector that is connected in an unauthorized way in the cascade connection, this projector can be prevented from becoming available for use.

Also, when the second or subsequent projector in the cascade connection does not receive the use permission information within a predetermined period of time, authentication may be carried out as with the leading projector in the cascade connection. Thus, even when a problem occurs in a connected projector for some reason and the use permission information cannot be transmitted thereto, this projector can be made available for use by authentication.

Moreover, the projector can be made available for use either on success of authentication by the authentication unit or on reception of the use permission information. Thus, the time and effort to carry out the authentication operation for all the plural projectors connected in cascade can be reduced.

BRIEF DESCRIPTION OF THE DRAWINGS

The invention will be described with reference to the accompanying drawings, wherein like numbers reference like elements.

FIG. 2A shows a state where projectors are connected by wires. FIG. 2B shows a state where a projector PJ2 accepts use permission information from a projector PJ1.

FIG. 2C shows a state where use permission information is transmitted from the projector PJ2 to a projector PJ3. FIG. 2D shows a state where all the projectors are available for use.

FIG. 4A shows an example of warning message when authentication fails. FIG. 4B shows an example of warning message when use permission information is not received within a predetermined period of time. FIG. 4C shows an example of warning message when received identification information does not conform.

DESCRIPTION OF EXEMPLARY EMBODIMENTS

Hereinafter, an embodiment of the invention will be described with reference to the drawings. The following embodiment is not intended to limit the invention described in the accompanying claims. Not all combinations of features of the embodiment are essential to measures for resolution according to the invention.

First Embodiment

Figure 1:
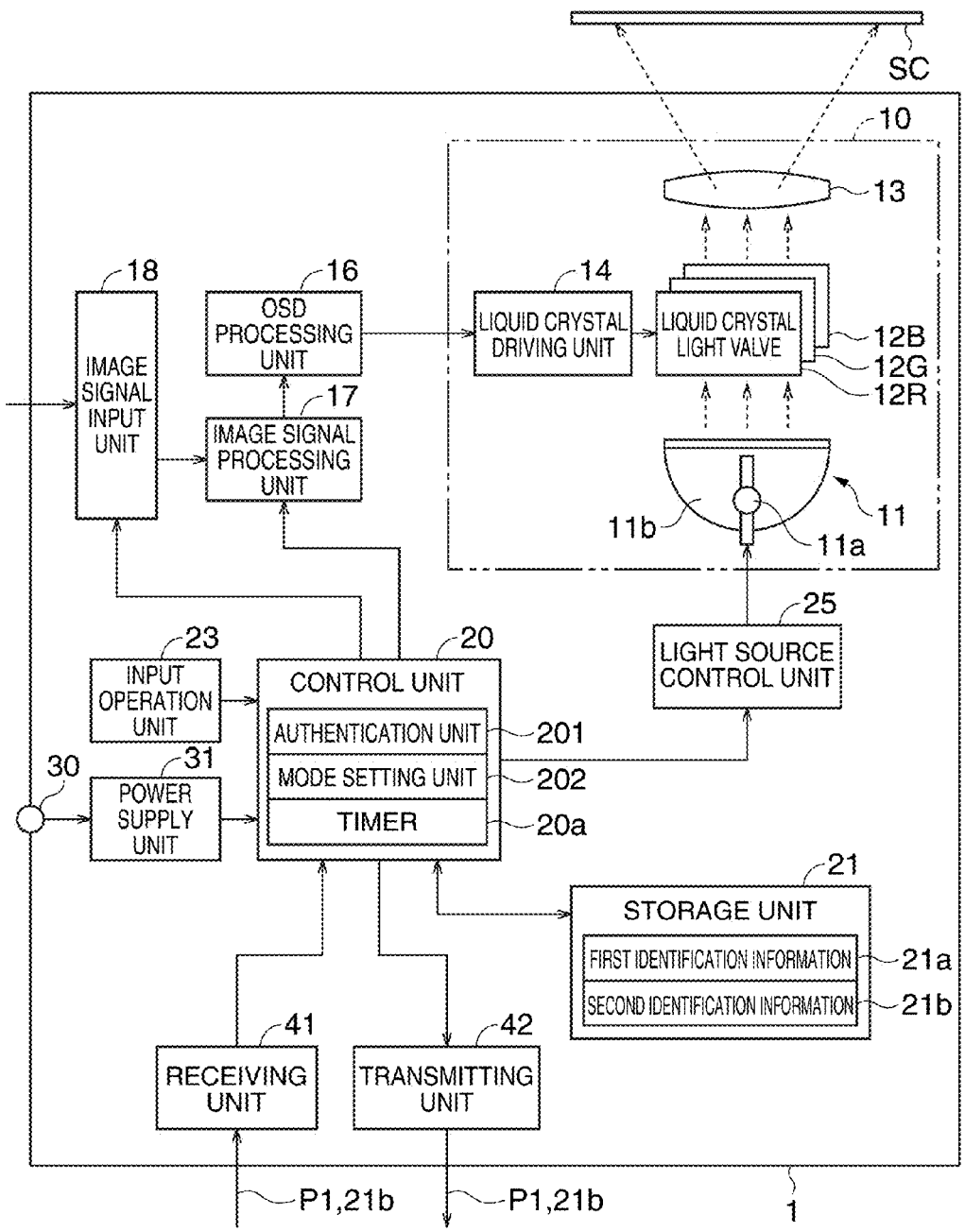
FIG. 1 is a block diagram showing the circuit configuration of a projector.

FIG. 1 is a block diagram showing the circuit configuration of a projector 1 according to this embodiment.

As shown in FIG. 1, the projector 1 includes an image projection unit 10, an OSD processing unit 16, an image signal processing unit 17, an image signal input unit 18, a control unit 20, a storage unit 21, an input operation unit 23, a light source control unit 25, a power supply terminal 30, a power supply unit 31, a receiving unit 41, a transmitting unit 42 and the like. These units are housed inside a casing of the projector 1, not shown.

The image projection unit 10 includes alight source 11, three liquid crystal light valves 12R, 12G, 12B as a light modulating device, a projection lens 13 as a projection system, a liquid crystal driving unit 14 and the like. The image projection unit 10 modulates, with the liquid crystal light valves 12R, 12G, 12B, light emitted from the light source 11, thus forms image light, and projects the image light from the projection lens 13, thereby displaying an image on a screen SC or the like.

The light source 11 includes a discharge-type light source lamp 11a made up of an ultrahigh pressure mercury lamp, metal halide lamp or the like, and a reflector 11b which reflects light radiated by the light source lamp 11a toward the liquid crystal light valves 12R, 12G, 12B. The light emitted from the light source 11 is converted to light with a substantially uniform luminance distribution by an optical integration system, not shown, and is separated into color light components of the primary colors of light, red (R), green (G) and blue (B), by a color separation system, not shown. Then, the color light components become incident respectively on the liquid crystal light valves 12R, 12G, 12B.

Each of the liquid crystal light valves 12R, 12G, 12B includes a liquid crystal panel formed by a pair of transparent substrates with liquid crystal enclosed between these substrates. In the liquid crystal light valves 12R, 12G, 12B, plural pixels (not shown) arrayed in a matrix are formed and a drive voltage can be applied to the liquid crystal at each pixel. As the liquid crystal driving unit 14 applies a drive voltage corresponding to inputted image information to each pixel, each pixel is set to a light transmittance corresponding to the image information.

Therefore, the light emitted from the light source 11 is transmitted through and thus modulated by the liquid crystal light valves 12R, 12G, 12B, and image light corresponding to image information is formed for each color light component. The resulting image light components of the individual colors are combined for each pixel by a light combining system, not shown, and thus form color image light. Then, the color image light is projected in an enlarged manner onto the screen SC or the like by the projection lens 13.

In the above embodiment, the projector 1 which projects light using the light source lamp 11a as the light source 11 is described as an example. However, the invention can also be applied to a projector which projects light using an LED (light emitting diode) light source or laser light source as the light source thereof. In the above embodiment, the image projection unit 10 including the light source 11 and the transmitting-type liquid crystal projection system using the three liquid crystal light valves 12R, 12G, 12B as a light modulating device is described as an example. However, the image projection unit 10 may also employ light modulating devices of other display systems such as reflection-type liquid crystal display system or micro mirror device system (light switch display system).

The control unit 20 includes a CPU (central processing unit), a RAM (random access memory) used for temporarily storing various data, and the like. The control unit 20 operates according to a control program (not shown) stored in the storage unit 21 and thus performs general control over operations of the projector 1. That is, the control unit 20, together with the storage unit 21, functions as a computer.

The control unit 20 includes an authentication unit 201 which authenticates the projector 1, a mode setting unit 202 which sets either a first mode for the projector 1 to operate as a leading projector in a cascade connection or a second mode for the projector 1 to operate as a second or subsequent projector in the cascade connection, and a timer 20a which measures time.

The storage unit 21 includes a rewritable non-volatile memory such as flash memory or FeRAM (ferroelectric RAM). In the storage unit 21, a control program for controlling operations of the projector 1, various setting data prescribing operating conditions of the projector 1 and the like are stored. In the storage unit 21, first identification information 21a which identifies the projector 1 and second identification information 21b which identifies a projector of a transmission destination which is connected in cascade with the projector 1 and to which information is transmitted by the transmitting unit 42 are saved as setting data.

When authentication succeeds with authentication information inputted by the input operation unit 23, which will be described, the projector 1 transmits use permission information P1 together with the second identification information 21b from the transmitting unit 42 if there is a projector that is registered in the second identification information 21b.

The input operation unit 23 is for the projector 1 to accept an input operation from a user. Although not shown, the input operation unit 23 has plural operation keys for the user to give various instructions to the projector 1. These operation keys are configured in the form of main body keys provided on an outer surface of the casing of the projector 1 or in the form of a remote controller (remote) for carrying out input operations remotely.

The operation keys provided on the input operation unit 23 include a power key to switch power-on and power-off alternately, a input switch key to switch plural input terminals for input to the image signal input unit 18, a menu key to display setting menus for various settings in a superimposed manner, a cursor key for the user to select a setting item from a menu, a decision key, an escape key, and authentication operation keys (for example, numeric keys) or the like to input authentication information in order to make the projector 1 available for use.

As the user operates various operation keys on the input operation unit 23, the input operation unit 23 outputs an operation signal corresponding to the user's operation content to the control unit 20. The input operation unit 23 may be configured with a remote (not shown) capable of remote operations with a remote signal receiving unit (not shown). In this case, the remote issues an operation signal of infrared ray or the like corresponding to the user's operation content. The remote signal receiving unit receives this signal and transmits the signal as control information to the control unit 20.

The image signal input unit 18 has plural image input terminals. At each image input terminal, image information is inputted from an external image output device such as video player device or personal computer via a cable, not shown.

The image signal processing unit 17 converts the image information inputted from the image signal input unit 18 to image information representing the gradation level of each pixel in the liquid crystal light valves 12R, 12G, 12B. Here, the converted image information is classified by color components R, G, B and includes plural pixels values corresponding to all the pixels in each of the liquid crystal light valves 12R, 12G, 12B. A pixel value defines the light transmittance of the corresponding pixel. This pixel value prescribes the intensity (gradation level) of light that is transmitted through and emitted from each pixel.

The OSD processing unit 16 carries out processing to display an OSD (on-screen display) image such as menu image or message image in a superimposed manner on a projection image, based on an instruction from the control unit 20. The OSD processing unit 16 has an OSD memory, not shown, and the OSD memory stores OSD image information representing graphic patterns, fonts and the like for forming OSD images.

As the control unit 20 gives an instruction to display an OSD image in a superimposed manner, the OSD processing unit 16 reads out necessary OSD image information from the OSD memory and combines this OSD image information with image information inputted from the image signal processing unit 17 so that the OSD image is superimposed at a predetermined position on the projection image. The image information combined with the OSD image information is outputted to the liquid crystal driving unit 14.

Meanwhile, when no instruction to superimpose an OSD image is given by the control unit 20, the OSD processing unit 16 outputs the image information inputted from the image signal processing unit 17, directly to the liquid crystal driving unit 14.

As the liquid crystal driving unit 14 drives the liquid crystal light valves 12R, 12G, 12B according to the image information inputted from the OSD processing unit 16, the liquid crystal light valves 12R, 12G, 12B form an image corresponding to the image information and this image is projected from the projection lens 13.

The light source control unit 25 controls the light source 11 to supply or stop power, based on an instruction from the control unit 20, and thus switches the light source 11 on and off.

The power supply unit 31 is supplied with power of AC 100V or the like from outside via the power supply terminal 30. The power supply unit 31 converts the inputted power (AC power) to predetermined DC power and supplies power to each part of the projector 1. The power supply unit 31 can also switch between a state where the power supply unit 31 supplies necessary power for projection of an image (operating power) to each part (power-on state) and a state where the power supply unit 31 stops supply of operating power and stands by for an operation to turn on power (standby state), based on an instruction from the control unit 20.

The receiving unit 41 communicates with the other projector(s) connected in cascade and receives the use permission information P1 and the second identification 21b.

The transmitting unit 42 communicates with the other projector(s) connected in cascade and transmits the use permission information P1 and the second identification information 21b.

Next, operations in a cascade connection of projectors according to this embodiment will be described with reference to FIGS. 2A to 2D.

Figure 2A:
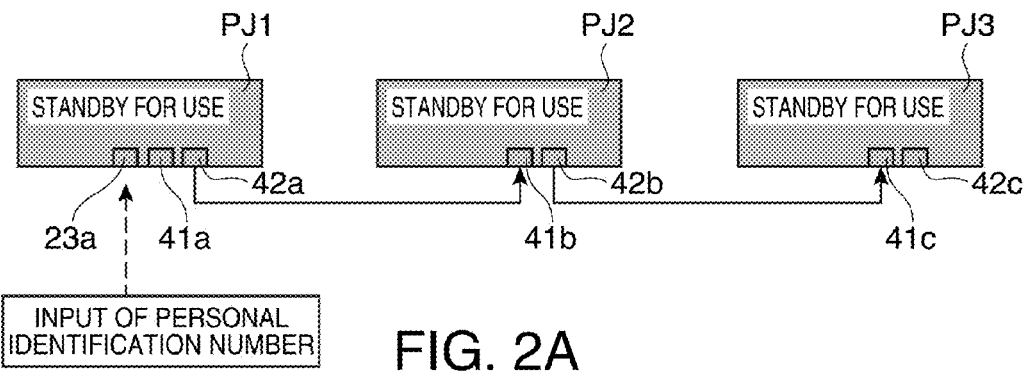
FIGS. 2A to 2D show a cascade connection of projectors.

FIG. 2A shows a state where projectors PJ1, PJ2, PJ3 are connected by wire. Projector PJ1 includes a receiving unit 41a and a transmitting unit 42a, projector PJ2 includes a receiving unit 41b and a transmitting unit 42b, and projector PJ3 includes a receiving unit 41c and a transmitting unit 42c. The projectors PJ1, PJ2, PJ3 are connected in cascade, with the transmitting unit 42a of the projector PJ1 connected to the receiving unit 41b of the projector PJ2, and with the transmitting unit 42b of the projector PJ2 connected to the receiving unit 41c of the projector PJ3. The projector PJ1 as the leading projector in the cascade connection is set to the first mode. The projectors PJ2, PJ3 as the second and subsequent projectors are set to the second mode. At this point, all the projectors PJ1, PJ2, PJ3 are on standby for use.

Figure 2B:
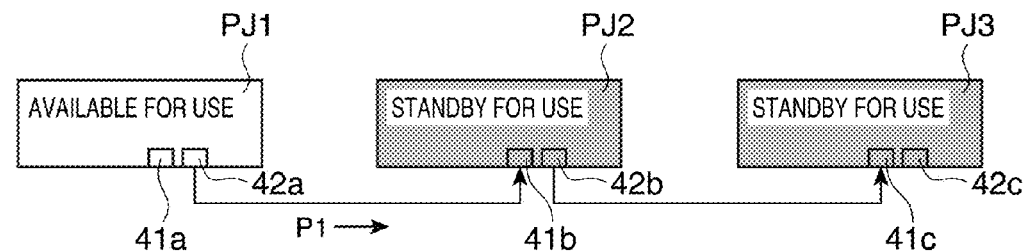

As shown in FIG. 2A, the projector PJ1 as the leading projector in the cascade connection carries out authentication on input of a personal identification number from an input operation unit 23a. When the authentication is successful, the projector PJ1 becomes available for use, as shown in FIG. 2B, and the use permission information P1 is transmitted from the projector PJ1 to the projector PJ2. At this point, also the second identification information 21b is transmitted by the transmitting unit 42a. However, the description of this transmission is omitted here.

Figure 2C:
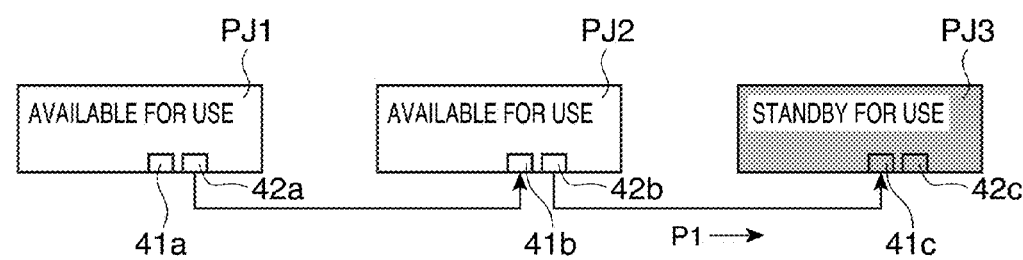

In FIG. 2B, as the projector PJ2 accepts the use permission information P1 from the projector PJ1, the projector PJ2 becomes available for use, as shown in FIG. 2C, and the use permission information P1 is transmitted from the projector PJ2 to the projector PJ3.

Figure 2D:
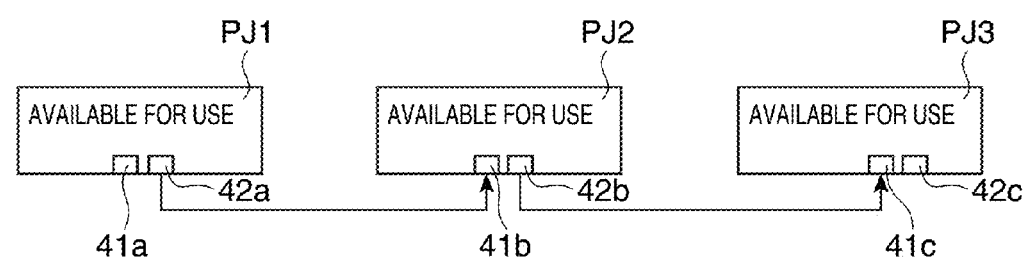

In FIG. 2C, as the projector PJ3 accepts the use permission information P1 from the projector PJ2, the projector P3 becomes available for use, as shown in FIG. 2D. Thus, all the projectors are now available for use.

Next, operations of the projector of this embodiment will be described with reference to the flowchart of FIG. 3.

Figure 3:
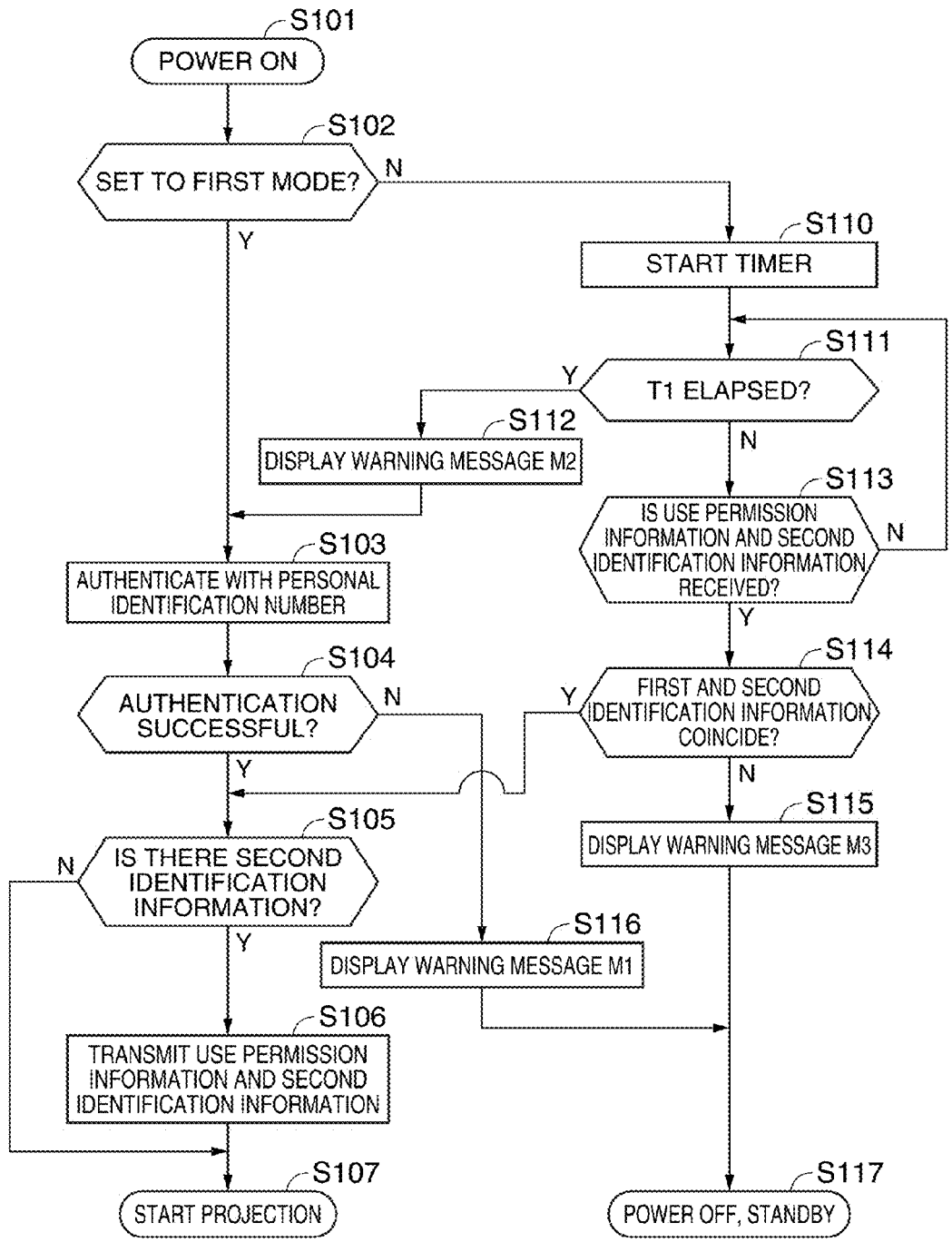
FIG. 3 is a flowchart showing operations of a projector.

As shown in FIG. 3, when the power of the projector 1 is turned on by a power-on operation on the input operation unit 23 (step S101), the control unit 20 examines whether the first mode is set by the mode setting unit 202 (the projector 1 is the leading projector in the cascade connection) or not (step S102).

When the first mode is set by the mode setting unit 202 (step S102: Y), the processing shifts to step S103. When the first mode is not set by the mode setting unit 202, that is, when the second mode is set (step S102: N), the processing shifts to step S110.

In step S103, the authentication unit 201 authenticates based on input of a personal identification number from the input operation unit 23 or the like and processing shifts to step S104.

In step S104, the control unit 20 examines whether the authentication in step S103 is successful or not. When the authentication is successful (step S104: Y), the processing shifts to step S105. When the authentication fails (step S104: N), the processing shifts to step S116.

In step S105, the control unit 20 examines whether effective information is saved in the second identification information 21b or not. When effective information is saved in the second identification information 21b (step S105: Y), the processing shifts to step S106. When effective information is not saved in the second identification information 21b (step S105: N), the processing shifts to step S107.

In step S106, the control unit 20 transmits the use permission information P1 and the second identification information 21b from the transmitting unit 42 and shifts to step S107.

In step S107, the control unit 20 projects, by the image projection unit 10, an image signal inputted from the image signal input unit 18 and ends this flow.

In step S110, the control unit 20 starts measuring time by the timer 20a and shifts to step S111.

Figure 4A:
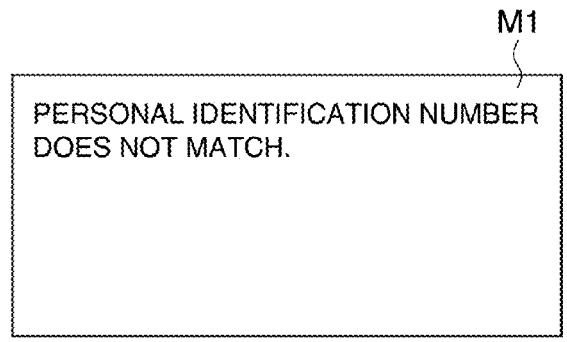
FIGS. 4A to 4C show examples of warning message.
Figure 4B:
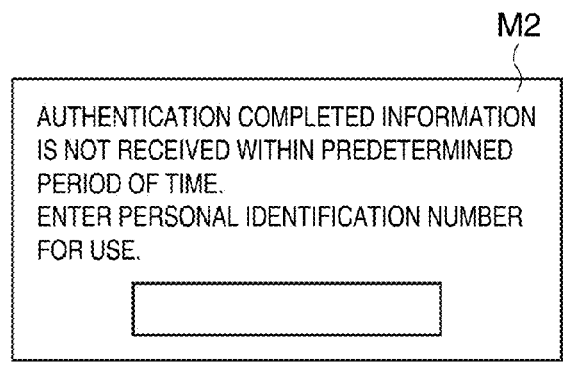

In step S111, the control unit 20 examines whether the elapsed time on the timer 20a is a predetermined time T1 (for example, 20 seconds) or not. When the elapsed time on the timer 20a is the time T1 (step S111: Y), a warning message M2 is projected for a predetermined period of time (step S112) and the processing shifts to step S103. An example of the warning message M2 in this case is shown in FIG. 4B.

Meanwhile, when the elapsed time on the timer 20a is not the time T1 (step 111: N), the processing shifts to step S113.

In step S113, the control unit 20 examines whether the use permission information P1 and the second identification information 21b are received by the receiving unit 41 or not. When the use permission information P1 and the second identification information 21b are received (step S113: Y), the processing shifts to step S114. When the use permission information P1 and the second identification information 21b are not received (step S113: N), the processing shifts to step S111.

In the step S114, the control unit 20 examines whether the second identification information 21b received in step S113 coincides with the first identification information 21a or not. When the second identification information 21b coincides with the first identification information 21a (step S114: Y), the processing shifts to step S105. When the second identification information 21b does not coincide with the first identification information 21a (step S114: N), the processing shifts to step S115.

Figure 4C:
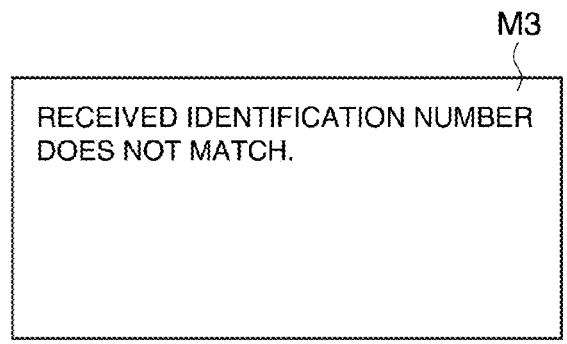

In step S115, the control unit 20 projects a warning message M3 for a predetermined period of time by the image projection unit 10 and shifts to step S117. An example of the warning message M3 in this case is shown in FIG. 4C.

In step S116, the control unit 20 projects a warning message M1 for a predetermined period of time by the image projection unit 10 and shifts to step S117. An example of the warning message M1 in this case is shown in FIG. 4A.

In step S117, the control unit 20 turns off the power of the projector 1 to shift to a standby state and ends this operation flow.

As described above, according to the projector 1 of this embodiment, the projector 1 is made available for use, on authentication by the authentication unit or reception of the use permission information P1. Thus, the time and effort to authenticate all the plural projectors connected in cascade can be eliminated.

As the leading projector in the cascade connection is authenticated and becomes available for use, the use permission information P1 is sequentially sent to the second and subsequent projectors and these projectors become available for use. Thus, by authenticating only the leading projector 1 in the cascade connection, all the projectors can be made available for use.

Also, the first identification information 21a which identifies the projector PJ1 and the second identification information 21b which identifies the next projector PJ2 connected in cascade are provided. The second identification information 21b is sent together with the use permission information P1 to the next projector PJ2.

When the second identification information 21b received together with the use permission information P1 coincides with the first identification information 21a which identifies the next projector PJ2, the projector PJ2 becomes available for use.

Thus, when there is a projector 1 connected in an unauthorized manner in the cascade connection, this projector 1 can be prevented from being used.

Also, in the case where a projector operates as the second or subsequent projector PJ2 in the cascade connection, when the use permission information P1 is not received within a predetermined period of time, authentication is carried out by the authentication unit 201 similarly to the leading projector PJ1 in the cascade connection. Thus, when the connected projector PJ1 cannot transmit the use permission information P1 for some reason, the next projector PJ2 connected in cascade can be authenticated and the use permission information P1 can be transmitted thereto. Therefore, the authenticated projector PJ2 and the subsequently connected projector (PJ3) can be made available for use.

The embodiment can be modified as follows.

Modification 1

In the projector 1 of the embodiment, when the first mode is set by the mode setting unit 202, the authentication unit 201 carries out authentication based on an input operation form the input operation unit 23. However, authentication may be carried out using authentication information acquired from an external storage medium. Thus, by connecting a storage medium storing authentication information to one projector, all the projectors connected in cascade can be made available for use.

What is claimed is:

1. A projector which modulates and projects light emitted from a light source according to image information, the projector comprising:
   a transmitting unit a receiving unit which enable connection in cascade to at least one other projector and are adapted for communicating with the other projector which is connected in cascade;
   a mode setting unit which sets either a first mode for the projector to operate as a leading projector in the cascade connection or a second mode for the projector to operate as a second or subsequent projector in the cascade connection;
   an input operation unit which accepts an input operation;
   an authentication unit which authenticates to make the projector available for use; and
   a control unit which controls an operation of the projector;
   wherein the control unit causes the authentication unit to perform authentication when the first mode is set by the mode setting unit and makes the projector available for use on success of authentication by the authentication unit or the control unit causes the receiving unit to accept use permission information of the projector when the second mode is set by the mode setting unit and makes the projector available for use on reception of the use permission information of the projector by the receiving unit.

2. The projector according to claim 1, wherein
   when the projector becomes available for use, the control unit causes the transmitting unit to transmit the use permission information to the other projector connected in cascade.

3. The projector according to claim 2, further comprising a storage unit that stores first identification information which identifies the projector and second identification information which identifies a destination projector to which the use permission information is transmitted,
   wherein when the projector becomes available for use, the control unit causes the transmitting unit to transmit the use permission information and the second identification information to the other projector connected in cascade, and
   when the second mode is set by the mode setting unit, the control unit causes the receiving unit to receive the use permission information and the second identification information, and when the second identification information coincides with the first identification information, the projector is made available for use.

4. The projector according to claim 2, wherein when the second mode is set by the mode setting unit and use permission information is not received by the receiving unit within a predetermined period of time, the control unit causes the authentication unit to perform authentication.

5. A projector which modulates and projects light emitted from a light source according to image information, the projector comprising:
- a transmitting unit and a receiving unit which enable connection in cascade to at least one other projector and are adapted for communicating with the other projector which is connected in cascade;
- a mode setting unit which sets either a first mode for the projector to operate as a leading projector in the cascade connection or a second mode for the projector to operate as a second or subsequent projector in the cascade connection;
- an input operation unit which accepts an input operation;
- an authentication unit which authenticates to make the projector available for use;
- a control unit which controls an operation of the projector; and
- a storage unit that stores first identification information which identifies the projector and second identification information which identifies a destination projector to which use permission information is transmitted,
- wherein the control unit makes the projector available for use on success of authentication by the authentication unit or on reception of the use permission information of the projector by the receiving unit,
- when the projector becomes available for use, the control unit causes the transmitting unit to transmit the use permission information and the second identification information to the other projector connected in cascade, and
- when the second mode is set by the mode setting unit, the control unit causes the receiving unit to receive the use permission information and the second identification information, and when the second identification information coincides with the first identification information, the projector is made available for use.

6. The projector according to claim 5, wherein when the second mode is set by the mode setting unit and use permission information is not received by the receiving unit within a predetermined period of time, the control unit causes the authentication unit to perform authentication.

7. A projector which modulates and projects light emitted from a light source according to image information, the projector comprising:
- a transmitting unit and a receiving unit which enable connection in cascade to at least one other projector and are adapted for communicating with the other projector which is connected in cascade;
- a mode setting unit which sets either a first mode for the projector to operate as a leading projector in the cascade connection or a second mode for the projector to operate as a second or subsequent projector in the cascade connection;
- an input operation unit which accepts an input operation;
- an authentication unit which authenticates to make the projector available for use; and
- a control unit which controls an operation of the projector,
- wherein when the second mode is set by the mode setting unit and use permission information is not received by the receiving unit within a predetermined period of time, the control unit causes the authentication unit to perform authentication, and
- the control unit makes the projector available for use on success of authentication by the authentication unit or on reception of the use permission information of the projector by the receiving unit.

8. A control method for a projector which modulates and projects light emitted from a light source according to image information,
- the projector including a transmitting unit a receiving unit which enable connection in cascade to at least one other projector and are adapted for communicating with the other projector which is connected in cascade, and a mode setting unit which sets either a first mode for the projector to operate as a leading projector in the cascade connection or a second mode for the projector to operate as a second or subsequent projector in the cascade connection,
- the method comprising:
- accepting an input operation;
- authenticating to make the projector available for use when the first mode is set by the mode setting unit;
- accepting use permission information of the projector when the second mode is set by the mode setting unit; and
- making the projector available for use on success of the authentication or on the reception of the use permission information of the projector.

* * * * *